United States Patent [19]

Westerman et al.

[11] Patent Number: 5,362,206
[45] Date of Patent: Nov. 8, 1994

[54] PUMP CONTROL RESPONSIVE TO VOLTAGE-CURRENT PHASE ANGLE

[75] Inventors: G. Wayne Westerman; Richard C. Montgomery; Gerald W. Pippin, all of Midland, Tex.

[73] Assignee: Automation Associates, Midland, Tex.

[21] Appl. No.: 95,693

[22] Filed: Jul. 21, 1993

[51] Int. Cl.⁵ .................................... F04B 49/02
[52] U.S. Cl. ...................................... 417/12; 417/18; 417/44.11; 417/53
[58] Field of Search .......... 417/44 J, 12, 18, 53; 318/798, 799, 454, 434; 361/23, 33

[56] References Cited

U.S. PATENT DOCUMENTS

| | | | |
|---|---|---|---|
| 2,691,300 | 10/1954 | Morris | 73/136 |
| 2,947,931 | 8/1960 | Hubby | 318/447 |
| 3,075,466 | 1/1963 | Agnew et al. | |
| 3,306,210 | 2/1967 | Boyd | |
| 3,413,535 | 11/1968 | Hubby | 318/447 |
| 3,440,512 | 4/1969 | Hubby | 318/474 |
| 3,509,824 | 5/1970 | Schmidly, Jr. | 417/12 |
| 3,610,779 | 10/1971 | Hubby | 417/5 |
| 3,778,694 | 12/1973 | Hubby et al. | 318/474 |
| 3,838,597 | 10/1974 | Montgomery et al. | 73/151 |
| 3,931,559 | 1/1976 | McKee | 318/455 |
| 3,936,231 | 2/1976 | Douglas | 417/12 |
| 3,951,209 | 4/1976 | Gibbs | 166/250 |
| 3,953,777 | 4/1976 | McKee | 318/474 |
| 3,998,568 | 12/1976 | Hynd | 417/53 |
| 4,015,469 | 4/1977 | Womack et al. | 73/151 |
| 4,034,808 | 7/1977 | Patterson | 166/250 |
| 4,058,757 | 11/1977 | Welton et al. | 318/474 |
| 4,286,925 | 9/1981 | Standish | 417/12 |
| 4,302,157 | 11/1981 | Welton et al. | 417/12 |
| 4,420,787 | 12/1983 | Tibbits et al. | 361/79 |
| 4,487,061 | 12/1984 | McTamaney et al. | 73/151 |
| 4,490,094 | 12/1984 | Gibbs | 417/42 |
| 4,499,422 | 1/1985 | Sinclair | 324/339 |
| 4,508,487 | 4/1985 | Taylor et al. | 417/12 |
| 4,509,901 | 4/1985 | McTamaney et al. | 417/18 |
| 4,561,299 | 12/1985 | Orlando et al. | 73/151 |
| 4,583,915 | 4/1986 | Montgomery et al. | 417/26 |
| 4,594,665 | 1/1986 | Chandra et al. | 364/422 |
| 4,841,404 | 6/1989 | Marshall et al. | 361/30 |
| 4,935,685 | 6/1990 | Justus et al. | 318/798 |
| 4,971,522 | 11/1990 | Butlin | 417/18 |
| 5,006,044 | 4/1991 | Walker, Sr. et al. | 417/12 |
| 5,284,422 | 2/1994 | Turner et al. | 417/18 |

Primary Examiner—Richard A. Bertsch
Assistant Examiner—David W. Scheuermann
Attorney, Agent, or Firm—Steven G. Lisa; Peter C. Warner

[57] ABSTRACT

A pump-off controller checks for pump-off by examining the relative phase relationship between AC voltage and AC current supplied to an inductive, alternating current, electric motor driving a cyclically operated mechanical system having a walking beam for raising and lowering a subsurface pump by means of a string of sucker rods. When the phase angle between AC voltage supplied to the motor and AC current drawn by the motor exceeds a predetermined value at selected points or regions of the pumping stroke, the pumping system is shut down for a predetermined time.

20 Claims, 3 Drawing Sheets

PUMP CONTROL RESPONSIVE TO VOLTAGE-CURRENT PHASE ANGLE

BACKGROUND OF THE INVENTION

The present invention is in the field of methods and apparatus for monitoring the operation of, and controlling, a sucker-rod pumping system such as used in the production of crude oil. In particular, the invention provides improved means for detecting incomplete pump filling and broken sucker rods.

In the production of oil, it is common practice to use a reciprocating, positive-displacement downhole pump connected to a surface beam-pumping unit by a string of sucker rods. Vertical reciprocating motion is transmitted from the surface pumping unit to the subsurface pump through the sucker rod string. In most cases the surface pumping unit is driven by an inductive, alternating-current ("AC") electric motor.

A "pumped-off" condition in a rod-pumped oil well occurs when the hydrostatic head—which is related to the height of fluid standing in the well bore—is reduced, thereby reducing the pump's suction pressure. Reductions in hydrostatic head are caused when the well is pumped faster than the rate at which fluid can flow into the well bore from the producing formation. Such reduced inflow pressure prevents the pump from filling completely with liquid, causing the pump to become partially filled with vapor, which results in the creation of a vapor-liquid interface.

As the pump starts on the downstroke when the well is pumped off, the traveling valve fails to open, maintaining the weight of the fluid column on the pump plunger and therefore on the rod string, and through it, on the pumping unit. The pumping system thus becomes "rod heavy," and the plunger travels at an increasing velocity through the vapor space until it strikes the vapor-liquid interface, resulting in a rapid transfer of kinetic energy from the rods to the tubing, a condition known as "fluid pound." Fluid pound can cause damage to surface and subsurface pumping equipment, such as rods, pump, or tubing.

Fluid pound occurs when the well is pumped off. Therefore, to prevent damage associated with fluid pound and to maintain production efficiency, it is desirable to stop the pumping system when pump-off occurs, to allow time for fluid to refill the well bore.

Should the rod string break—another frequent problem in pumping wells—the pumping system will be placed in a condition of imbalance. The system becomes "counterweight heavy" due to the loss of the fluid load supported by the rod string. Continuing to operate in the unbalanced condition that results from a broken rod not only is highly inefficient (in that no liquid is being produced) but also may result in damage to the surface equipment. It is desirable to stop the operation of the pumping system in such a circumstance and to activate an alarm, to alert the operator that a problem exists.

A number of pump controllers have been produced that employ rod load and displacement measurement to detect a pumped-off condition automatically. Each of the following examples of pump-off controllers examines the load on the pumping equipment in relation to at least one position in the pumping stroke:

Boyd et al. teach in U.S. Pat. No. 3,306,210 comparison of rod loading at a predetermined point in the downstroke to a predetermined load value, and use mechanical means for the detection and control of pump-off.

Standish teaches in U.S. Pat. No. 4,286,925 comparison of rod loading at a predetermined position in the downstroke to a predetermined load value, and uses electronic means for the detection and control of pump-off.

McTamaney et al. teach in U.S. Pat. No. 4,487,061 comparison of rod loading at a predetermined position in the downstroke to a predetermined load value, also using electronic means for the detection and control of pump-off.

It is common practice to calculate the work done by the rod string by integrating the polished rod load with respect to polished rod displacement for one complete stroke of the pumping unit. Each of the following examples of pump-off controllers examines the work being done by the pump for all or a portion of the pumping stroke:

Gibbs teaches in U.S. Pat. No. 3,951,209 detection of a decrease, between the full-pump and pumped-off condition, in the integration value of the entire area within the dynagraph, which is a chart produced by measurement of the rod loading and rod displacement as a means for detecting and controlling pump-off.

Womack et al. teach in U.S. Pat. No. 4,015,469 detection of a decrease, between the full-pump and pumped-off condition, in the integrated area within the upper-stroke portion of the dynagraph as a means for detecting and controlling pump-off.

Montgomery et al. teach in U.S. Pat. No. 4,583,915 detection of an increase, between the full-pump and pumped-off condition, in an integrated area below the downstroke load measurements as a means for detecting and controlling pump-off.

Montgomery et al. teach in U.S. Pat. No. 5,224,834 detection of an increase, between the full-pump and pumped-off condition, in an integrated area comprising a part of the downstroke.

A number of other pump-off controllers have been produced that detect pump-off by identifying changes in the current supplied to the induction alternating current electric motor, which drives a cyclically operated walking beam pumping unit to raise and lower the subsurface pump by means of a string of sucker rods. Each of the following systems measures the relative amount of energy supplied to the motor during several pumping strokes or a portion of a pumping stroke:

Hubby teaches in U.S. Pat. No. 3,440,512 detection of an increase, from the full-pump to the pumped-off condition, in the difference in peak values of motor current between an upstroke and a subsequent downstroke as a means for detecting and controlling pump-off.

McKee teaches in U.S. Pat. No. 3,953,777 detection of a decrease, between the full pump and pumped-off condition, in the average current drawn by the motor over a period of greater than one pumping stroke as a means for detecting and controlling pump-off.

Welton et al. teach in U.S. Pat. No. 4,058,757 detection of the reduction, from the full pump to the pumped-off condition, in the integrated value of motor current drawn during a portion of one pumping stroke as a means for detecting and controlling pump-off.

Schmidly, Jr. teaches in U.S. Pat. No. 3,509,824 detection of the reduction, between the full pump and pumped-off condition, in electrical power consumed by the motor during the down portion of the pumping stroke as a means for detecting and controlling pump-off.

In addition, Tibbetts et al. teach in U.S. Pat. No. 4,420,787 a process of detecting reduced loading of a motor, but there is no apparatus disclosed for selecting part of a pumping stroke, and the Tibbetts process is not suitable for use with a reciprocating pump stroke.

In general, prior art systems are not entirely satisfactory, because they generally require expensive and complex, and in some cases unreliable, components. Those systems requiting the measurement of polished rod load and displacement are expensive to purchase, install, and maintain. Those systems relying on measurement of motor current require careful sizing of measuring elements and are subject to errors from fluctuations in line voltage. In addition, prior art systems typically require manual calibration of the logic for a specific well, in part because the algorithms may vary depending on the capacity of the pumping equipment.

SUMMARY OF THE INVENTION

It is an object of the invention, therefore, to provide new and improved systems and methods for the detection of the condition known as "pump-off."

It is another object of the invention to provide new and improved systems and methods for detecting and automatically eliminating "fluid pound," preventing the associated loss of production and possible damage to equipment.

It is another object of the invention to provide new and improved systems and methods for detecting a break in a rod string and preventing the associated loss of production and possible damage to equipment.

It is another object of the invention to provide new and improved systems and methods for automatic calibration of the pump-off detection and rod-part-detection logic for any well, without regard to the size of equipment used.

It is another object of the invention to provide new and improved systems and methods for detection of "pump-off" and rod parting with increased reliability.

It is another object of the invention to provide new and improved systems and methods for detection of "pump-off" and rod parting with low-cost equipment.

The above and other objects are achieved in the present invention through the use of measurements of the characteristics of the power supplied to the AC electric driving motor to detect pump-off and rod parting. The inventive system uses measurements of the phase angle between the AC voltage supplied to the electric motor and the AC current drawn by the motor to infer useful information about the load on the motor, from which decisions can be made about how to operate the pumping system in a manner that is more efficient and more economical than is possible without use of the invention. The invention utilizes a position sensor to detect a position of the rod string, and a control circuit that measures the phase angle between the current flowing through the motor and the voltage placed on the motor.

In accordance with another aspect of the invention, a first control operation uses the principle that the motor's power on the downstroke will decrease if the pumping equipment is operating in the "rod heavy" condition characteristic of pump-off. In that operation, the phase angle between current and voltage is compared to a set point at one or more points in the down portion of the pumping stroke. If the phase angle exceeds the set point, it is recognized that the motor is experiencing less load than normal, and the well is considered pumped-off, causing the activation of a control relay to stop the operation of the pumping system for a predetermined down-time.

The test for reduced loading can be accomplished in any of several alternative disclosed embodiments of the invention: (1) by integrating the phase angle for a predetermined portion of the downstroke and declaring pump-off if the integral exceeds a predetermined value; (2) by integrating the phase angle at a predetermined number of places in the downstroke and declaring pump-off if the integral exceeds a predetermined value at all of the points; or (3) by calculating the average phase angle during the upper part of the downstroke and declaring pump-off if the result exceeds a predetermined value. If the results of the selected test indicate pump-off, a control relay is activated to stop the operation of the pumping system for a predetermined down-time.

In accordance with yet another aspect of the invention, a second control operation uses the principle that the motor's power on the upstroke will decrease if the pumping equipment is operating in the "weight heavy" condition characteristic of a parted rod string. In that operation, any of the tests described above is repeated during the upstroke. If the test indicates the presence of a parted rod string, a control relay is activated to stop the operation of the pumping system and to set an alarm until the control circuit is manually reset.

Thus, the inventive system and methods are unique and superior to other methods of pump-off control and malfunction detection, because the invention allows for the production of a low-cost, highly reliable system, which is simple and inexpensive to install and to operate. The use of phase angle allows (1) application of the system to any well, regardless of the sizing of the current transformer, and (2) effective automatic calibration of the pump-off detection and malfunction-detection functions of the system.

Other aspects of the invention will be appreciated by those skilled in the art after reviewing the following detailed description of the invention.

BRIEF DESCRIPTION OF THE DRAWINGS

The novel features of the invention are described with particularity in the claims. The invention, together with its objects and advantages, will be better understood after referring to the following description and the accompanying figures.

DETAILED DESCRIPTION OF THE PREFERRED EMBODIMENTS

Figure 1:
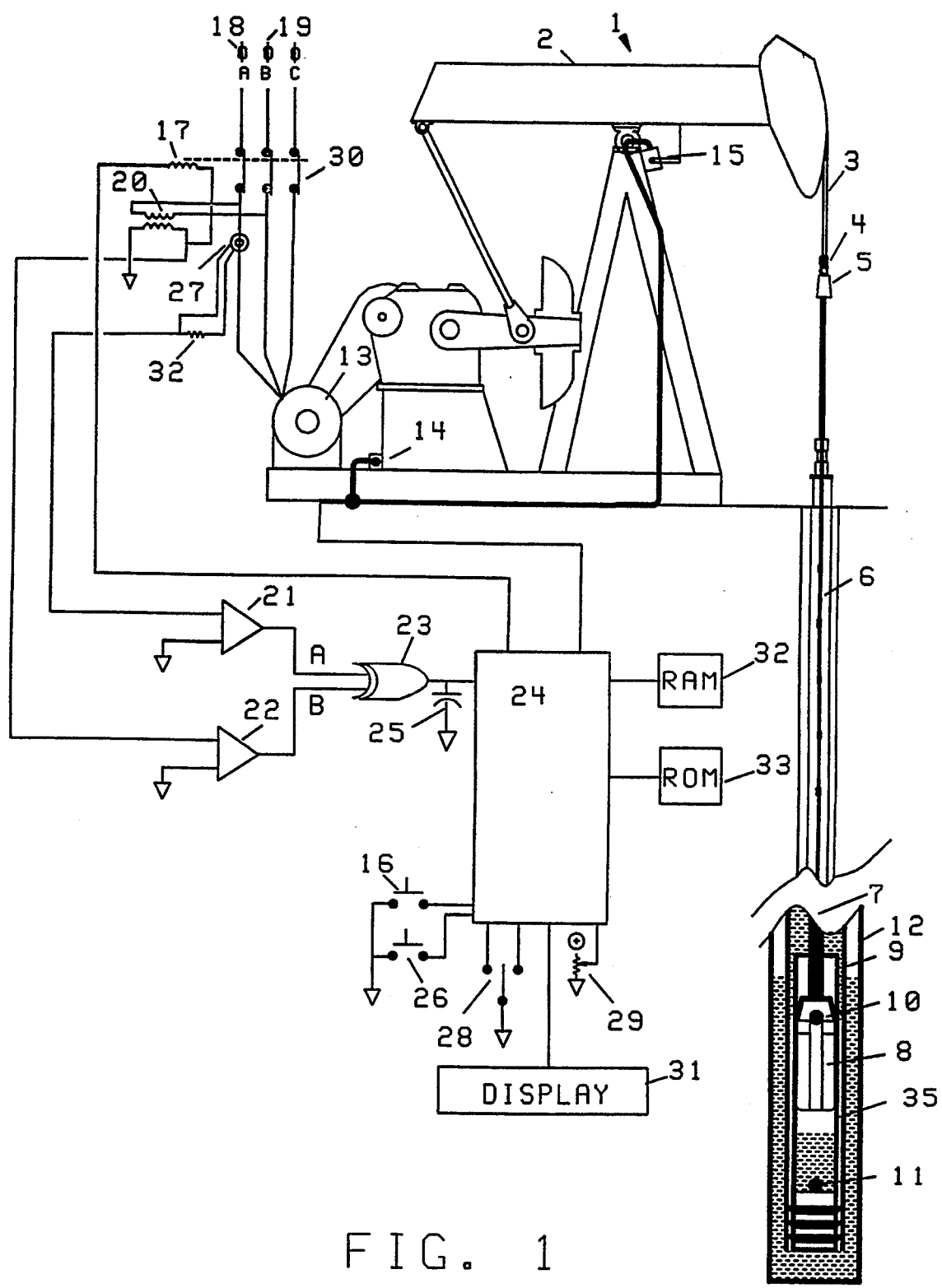
FIG. 1 is a pan-schematic, part-diagrammatical illustration including (not to scale) a side elevation and cross-section of a beam pumping unit including a preferred embodiment of the invention.

FIG. 1 shows beam pumping unit 1 composed of walking beam 2 connected to wire-line bridle 3 supporting carrier bar 5. Sucker rod string 6 is supported by carrier bar 5 using clamp 4. Reciprocating vertical motion is imparted to pump plunger 8, through pull rod 7, by sucker rod string 6 from pumping unit 1 through bridle 3 and carrier bar 4. On the upstroke, traveling valve 10 is closed and the weight of the fluid in tubing 9 is supported by sucker rod string 6, allowing fluid to enter pump barrel 35 through standing valve 11. On the downstroke, the liquid in pump barrel 35 forces traveling valve 10 to open, transferring the fluid load from sucker rod string 6 to tubing 9.

When a well enters a "pumped off" condition, pump barrel 35 is only partially filled with liquid, and the remainder of pump bin-tel 35 becomes filled with vapor. In that condition, there will be insufficient pressure in pump barrel 35 to cause traveling valve 10 to open, and therefore the weight of the fluid in tubing 9 remains on sucker rod string 6 during the early portion of the downstroke.

In known pumping systems, electrical power is used in three ways: (1) overcoming mechanical friction and electrical resistance, (2) imparting reciprocating and cyclic kinetic energy necessary to move the system elements, and (3) lifting the fluid. However, the power required to overcome friction and to impart rotating motion to the pumping unit is fixed. Therefore, observed variations in motor power are directly related in variations in static and kinetic fluid loads.

Thus, even though the instantaneous power requirements from the electric motor prime mover vary widely and constantly throughout the pumping cycle, observation of the power demand placed on the electric motor prime mover can provide an indication of the mechanical loading placed on the pumping unit. The inventive system analyzes the power demands placed on the electric motor used as the prime mover to determine the operating condition of the system.

The power used by an inductive AC motor 13, such as those typically used in beam pumping operations, is proportional to the time integral of the product of the motor voltage, motor current, and the power factor, which is the cosine of the phase angle between the voltage and current waves. The relationship is demonstrated by the equation:

$$P = \int_{t1}^{t2} E \cdot I \cdot \cos \theta \, dt,$$

where:
P is power (in watts);
E is voltage (in volts);
I is current (in amps); and
$\theta$ is the phase angle between current and voltage.

Therefore, the load placed on an inductive AC motor 13 is (1) directly proportional to the product of voltage on the motor and current flowing through the motor (volt-amps), (2) directly proportional to the power factor (cos $\theta$), and (3) inversely proportional to the phase angle ($\theta$)) between the voltage on the motor and the current flowing through the motor. For an ideal inductive, AC electric motor, the phase angle in a fully loaded condition will equal zero degrees (power factor of one)—that is, the current and voltage are in phase- and the phase angle in a fully unloaded condition will equal 90° (power factor of zero)—that is, the current and voltage are out of phase. Either volt-amps or phase angle may be used to determine the relative load on the motor. The voltage, current, and power factor may be measured by known electrical means, and the power consumed may be calculated for any interval of operation.

As the power consumed by an inductive AC electric motor varies, the electrical reactance of the motor also varies. When the motor is fully loaded, its reactance is more resistive, and the AC current drawn by the motor tends to be in phase with the AC voltage supplied to the motor. When the motor is less loaded, its reactance is more inductive, and the AC current drawn by the motor tends toward lagging the AC voltage supplied to the motor so that the two are partially (or completely) out of phase.

The increased rod load during the downstroke in the pumped-off condition reduces the power requirements on motor 13, that is, the current/voltage phase angle increases and the volt-amps decrease. The same effect will occur on the upstroke if the well is operated in a "rod-parted" condition.

A preferred embodiment of the invention operates to measure phase angle, and therefore to determine the relative load on the motor, which is used to infer the presence of pump problems. Position switch 14 or position transducer 15 is used, through an input into computer 24, to determine when the pumping unit is at the top of the stroke. The time interval between tops of successive strokes is used to determine the period of the stroke. It is assumed that the upstroke will begin at a time equal to one half of the stroke period after the top of the stroke.

Pressing start/stop switch 16 will cause holding coil 17 to reverse its operating condition, switching motor contact 30. That is, if the motor is running, pressing start/stop switch 16 will cause the motor to stop; if the motor is stopped, pressing start/stop switch 16 will cause the motor to start. Pressing and holding start/stop switch 16 through two top of stroke events will cause computer 24 to initiate an automatic calibration sequence.

Pressing display switch 28 up will increment the current display register one register; pressing display switch 28 down will decrement the current display register one level. A predetermined delay time, for example one hour, after display switch 28 has been activated, display 31 reverts to showing a predetermined set of information.

Pressing set switch 26 causes computer 24 to read the analog voltage value from parameter adjustment potentiometer 29 and to write that value to the current display register. To change data in a register, set switch 26 is pressed and held while parameter adjustment potentiometer 29 is adjusted to the desired value.

Figure 2:
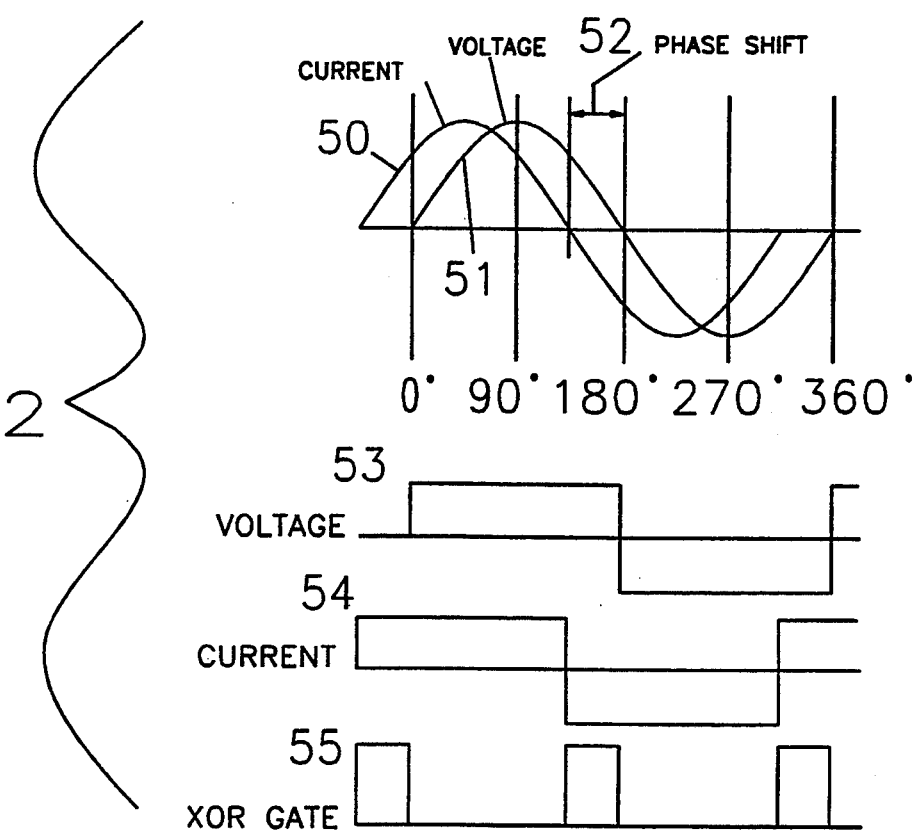
FIG. 2 shows a series of related timing diagrams illustrating an aspect of the invention.

Transformer 20 transforms the line voltage between motor phase A 18 and motor phase B 19 down to a level acceptable to the electronic components. Voltage signal 51, shown in FIG. 2, is placed on the input of comparator 22, which is referenced to circuit common. When the voltage is below the reference, comparator 22 issues a low output, and when the voltage is above the reference, the output of the comparator 22 is high, creating signal 53, shown in FIG. 2.

The current flowing in motor phase A 18 is measured by current transformer 27 installed around the wire leading from motor contact 30 to motor 13. The current from current transformer 27 is converted to a voltage across resistor 32. The resulting voltage, signal 50 in FIG. 2, is placed on the input of another comparator 21, which is also referenced to circuit common. When the voltage is below the reference, comparator 21 issues a low output, and when the voltage is above the reference, the output of comparator 21 is high, creating signal 54 shown in FIG. 2. Because the output from current transformer 27 is input into a high-gain comparator 21, the turns ratio of current transformer 27 has no impact on the system disclosed.

The output signal of current comparator 21 is placed on input A of exclusive OR gate 23. The output signal of voltage comparator 22 is placed on input B of exclusive OR gate 23. The output of exclusive OR gate 23 is high when either of the logical expression (A & not B) or (not A & B) are true. In other words, gate 23 produces a high output for the out-of-phase condition, creating signal 55 shown in FIG. 2. Computer 24 calculates out-of-phase time 52 between AC voltage and AC current (shown in FIG. 2) by measuring the time period for which signal 55, the output of exclusive OR gate 23, is high. To convert out-of-phase time 52 to degrees, the measured out-of-phase time 52 is divided by 46.2 microseconds per degree of phase angle (which is the reciprocal of 60 cycles per second times 360° per cycle).

The resulting phase angle, derived by the above-described procedure, is summed over a large number of power cycles to create a motor load control function. The resulting integral can be normalized by dividing by the number of power cycles, if desired. Pump-off can be detected by comparing that function, calculated for a selected portion of the downstroke, to a predetermined value. When the integral exceeds a predetermined value, a pump-off violation is recognized.

A position measurement is necessary to establish the portions of the stroke to be investigated to test for pump-off or rod-parted conditions. Analog position transducer 15 may be used to provide position information to computer 24. The analog position signal from position transducer 15 is compared to a predetermined "start integration" value and a predetermined "end integration" value, both of which are stored in RAM 32. When the analog position signal is within the limits of those values, computer 24 integrates the phase angle.

Alternatively, because the motion of pumping unit 1 is sinusoidal and repetitive (within the limits of the slip of the motor), a time increment based on the activation of position switch 14 may be substituted for analog position transducer 15. In that system, a signal from position switch 14 indicates the passage of walking beam 2 past a predetermined point in the pumping stroke. The computer 24 calculates the time of "top of stroke" by observing the time at which the signal from position switch 14 goes high and adding the time period from switch closure to the top of the stroke. Computer 24 then integrates the phase angle for a predetermined period in the downstroke beginning at a predetermined time after the top of the stroke and ending at a later predetermined time after the top of the stroke.

After the "end integration" position has been reached, the resulting integral is compared to a predetermined value, and the integration register is reset to zero. If the product of integration is found to exceed the predetermined value, a pump-off violation is recognized, and after a predetermined number of violations, control relay 17 is activated, opening contact 30 to shut off pumping unit 1. At the same time that the "off" command is issued to holding coil 17, computer 24 initiates a timer function. At the expiration of a predetermined time period an "on" command is issued by computer 24 to holding coil 17, restarting pumping unit 1. Thereafter, the pump-off control test is repeated.

Figure 3A:
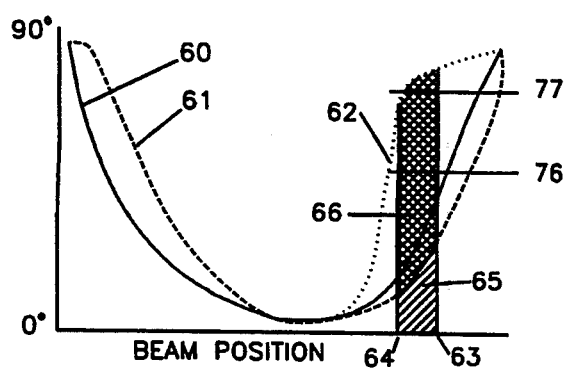
FIGS. 3a through 3d show shows a series of phase angle traces for pumps in various states, and an aspect of several algorithms implemented by the apparatus and methods of the invention.
Figure 3C:
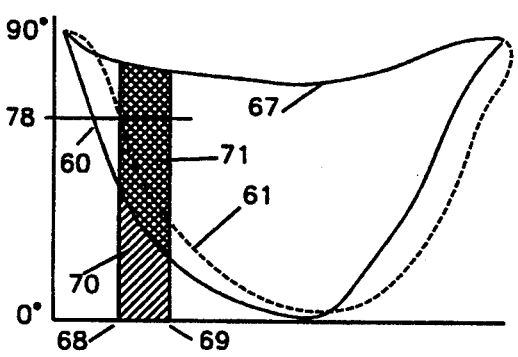
Figure 3B:
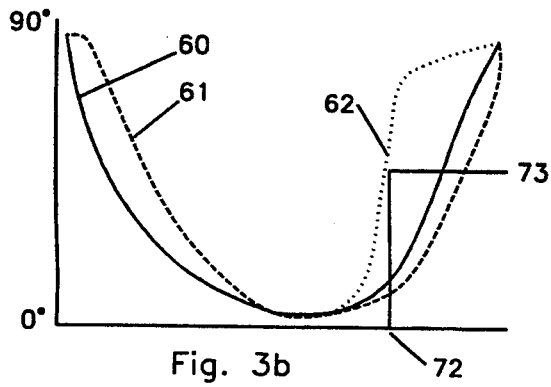
Figure 3D:
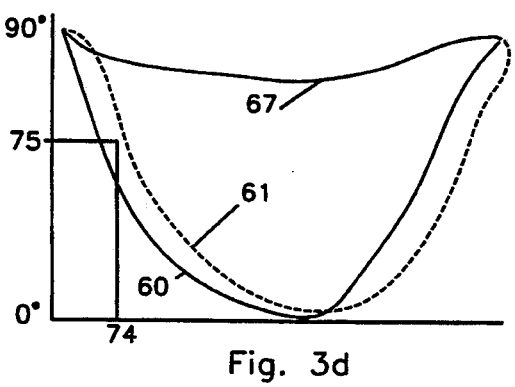

The method of problem detection is illustrated graphically in the four phase-angle diagrams of FIG. 3a through 3d. In each of those diagrams, phase angle, shown on the Y-axis, is plotted against pump position, on the X-axis, with the top of stroke at the right of the diagram. In each of those diagram, trace 60 represents phase angle measured on the upstroke and trace 61 represents phase angle measured on the downstroke, during full-pump conditions. Pump-off is shown in FIGS. 3a and 3b, in which trace 61, representing phase angle during the downstroke, has been distorted during part of the stroke, as indicated by partial trace 62. Rod breaks are illustrated in FIGS. 3c and 3d, in which upstroke trace 60 has been distorted into trace 67.

The integration method of detecting pump-off is graphically illustrated in FIGS. 3a and 3d. To detect pump-off conditions, the phase angle is integrated between position (or time) 63, which is early in the downstroke, to a point 64 later in the downstroke. If the well is operating in full-pump condition (FIG. 3d), shaded area 65 indicates the resulting integral. In pump-off conditions, however, area 66 is added to the integral. The change in area can be detected as indicated and compared to a threshold value, shown in FIG. 3a as the area below line 76 and between points 63 and 64.

Alternately, pump-off can be detected by comparing the average value of the current/voltage phase shift for an interval during a portion of the downstroke. The output of exclusive OR gate 23 in FIG. 1 is placed in capacitor 25 to derive a control function. The resulting signal, which is proportional to the analog value of the phase angle between AC current and AC voltage, is placed on an analog input to computer 24, which can calculate the average value on that input. That average is then compared to a predetermined set point, at a predetermined time after the closure of position switch 14 or the receipt of the appropriate signal from analog position indicator 15. If the average value exceeds the predetermined set point, computer 24 issues an "off" command to holding coil 17, opening contact 30 and stopping operation of pumping unit 1. The average-value method is illustrated in FIG. 3a, in which level 77 represents the average value of trace 62 between points 63 and 64.

As another alternative, pump-off can also be detected by evaluating the instantaneous value of the control function at a particular time in the downstroke. In that system, at a predetermined time after the activation of position switch 14 or analog position transducer 15 (FIG. 1), computer 24 reads the value of phase-shift time 55 (FIG. 2), produced by exclusive OR gate 23 across capacitor 25, and compares that value to a predetermined value. If the value exceeds a predetermined value, control relay 17 is activated, opening contact 30 and shutting off the operation of pumping unit 1.

FIG. 3b and 3d illustrate the instantaneous-value system of detecting pump-off. In FIG. 3b the phase angle on the downstroke is measured at a particular place or time during the downstroke, indicated by the line at numeral 72. The resulting measured value, which is lower for trace 150 (full pump) than for trace 62 (pump-off) is compared with threshold 73. If the value of the measured phase angle exceeds threshold 73 at sample point 72, a pump-off violation is declared.

Rod parting can be detected by performing any of the above-described alternative procedures during the upstroke rather than during the downstroke. In FIG. 3c the value of phase angle on the upstroke is integrated between positions (or times) 68 and 69, yielding area 70 (full pump) or the sum of areas 70 and 71 (parted sucker-rod string). The result is compared to a threshold level, shown in FIG. 3c as the area below line 78 and between points 68 and 69. In the instantaneous-value method, the phase angle measured at position (or time) 74 is compared to threshold 75, as shown in FIG. 3d.

To accomplish automatic calibration of the pump-off controller, the operator presses start/stop switch 16 (FIG. 1) to stop the operation of the pumping unit. The well is left shut in for a long period of time, for example one hour. The operator then restarts the pumping unit by pressing start/stop switch 16 and allows the pump to run through a number, for example two, complete pumping strokes. The computer 10 then will wait for a number of complete strokes, for example five, to allow the well to stabilize, before starting to collect data for calibration.

After the selected number of strokes have been completed, computer 24 calculates the stroke period by measuring the time between closures of position switch 14 or the analogous measurement from position transducer 15.

Next, the control function calculated for pump-off using any of the above-described procedures on the downstroke is summed over a predetermined number of strokes, such as ten cycles. At the end of that period, summed control function is divided by the number of strokes, and that average result is saved and used as the predetermined value for pump-off testing. A predetermined value for use in rod-part testing is calculated in a like manner, using the control function calculated using any of the above-described procedures on the upstroke.

The automatic calibration feature is therefore simple to implement and can be applied to all wells, regardless of the equipment's pumping capacity. More generally, the inventive system uses only components readily available at low cost and having a high level of reliability. Nonetheless, the low-cost controller can provide great accuracy in detecting pump problems.

Thus, it is understood by those skilled in the art that alternative forms and embodiments of the invention can be devised without departing from its spirit and scope.

We claim:

1. A process of controlling an inductive, alternating current, electric motor of a well-pumping unit cyclically operating to reciprocate a subsurface pump by means of a sucker rod string, comprising:
    (a) during each reciprocation cycle, repeatedly measuring phase angle between voltage applied to and current drawn by the motor;
    (b) producing a control function related to the measured phase angle for a predetermined portion of the reciprocation cycle;
    (c) comparing a value of the control function with predetermined limit value; and
    (d) if the value of the control function exceeds the limit value, shutting off the motor at least temporarily.

2. The process of claim 1 wherein producing a control function comprises producing the function during a predetermined portion of the upstroke to detect rod breaks.

3. The process of claim 1 wherein producing a control function comprises integrating the phase angle measured during a predetermined segment of the reciprocation cycle.

4. The process of claim 1 wherein producing a control function comprises measuring the phase angle at a predetermined position in the reciprocation cycle.

5. The process of claim 1 wherein producing a control function comprises measuring the phase angle at a predetermined time in the reciprocation cycle.

6. The process of claim 1 wherein producing a control function comprises averaging the phase angle measured during a predetermined section of the reciprocation cycle.

7. The process of claim 1 wherein producing a control function comprises producing the function during a predetermined portion of the downstroke to detect pump-off.

8. The process of claim 1 further comprising automatically producing the limit value by:
    (a) operating the pumping unit for a predetermined number of reciprocation cycles;
    (b) producing the control function for each of a predetermined number of reciprocation cycles; and
    (c) averaging a value of the control function over the predetermined number of cycles to produce the limit value.

9. The process of claim 8 further comprising producing two control functions, one during a predetermined portion of the downstroke and the other during a predetermined portion of the upstroke.

10. An apparatus for controlling an inductive, alternating current, electric motor of a well-pumping unit cyclically operating to reciprocate a subsurface pump by means of a sucker rod string, comprising:
    (a) means for, during each reciprocation cycle, repeatedly measuring phase angle between voltage applied to and current drawn by the motor;
    (b) means for producing a control function related to the measured phase angle for a predetermined portion of the reciprocation cycle;
    (c) means for comparing a value of the control function with a predetermined limit value; and
    (d) means for shutting off the motor at least temporarily if the value of the control function exceeds the limit value.

11. The apparatus of claim 10 further comprising means for automatically producing the limit value by;
    (a) operating the pumping unit for a predetermined number of reciprocation cycles;
    (b) producing the control function for each of a predetermined number of reciprocation cycles; and
    (c) average a value of the control function over the predetermined number of cycles to produce the limit value.

12. The apparatus of claim 10 wherein the means for producing a control function comprises means for integrating the phase angle measured during a predetermined segment of the reciprocation cycle.

13. The apparatus of claim 10 wherein the means for producing a control function comprises means for measuring the phase angle at a predetermined position in the reciprocation cycle.

14. The apparatus of claim 10 wherein the means for producing a control function comprises means for measuring the phase angle at a predetermined time in the reciprocation cycle.

15. The apparatus of claim 10 wherein the means for producing a control function comprises means for averaging the phase angle measured during a predetermined section of the reciprocation cycle.

16. The apparatus of claim 10 wherein the means for producing a control function comprises means for producing the function during a predetermined portion of the downstroke to detect pump-off.

17. The apparatus of claim 10 wherein the means for producing a control function comprises means for producing the function during a predetermined portion of the upstroke to detect rod breaks.

18. The apparatus of claim 11 further comprising means for producing two control functions, one during a predetermined portion of the downstroke and the other during a predetermined portion of the upstroke.

19. An apparatus for controlling an inductive, alternating current, electric motor of a well-pumping unit cyclically operating to reciprocate a subsurface pump by means of a sucker rod string, comprising:

(a) a transducer configured to emit an electronic signal when a portion of the pumping apparatus passes at least one point during a reciprocation cycle;

(b) a current transformer connected so as to measure the current drawn by the electric motor and transform it to an output voltage;

(c) a first comparator coupled to the motor supply voltage and to the output of the current transformer that produces a signal proportional to the phase angle between the voltage applied to the motor and the current drawn by the motor;

(d) a computing circuit that sums the signal produced by the first comparator;

(e) a timer coupled to the transducer and to the computing circuits and configured to activate the summing during a predetermined portion of the reciprocation cycle;

(f) a second comparator coupled to the computing circuit that compares the summed signal with a predetermined limit value and produces a signal on an output if the summed signal exceeds the limit value; and (g) a motor cut-off switch coupled to the output of the second comparator.

20. The apparatus of claim 19 further comprising:

(a) a memory device that stores the limit value; and (b) a second computing circuit coupled to the first computing circuit, to the memory device, and to a pump start-up switch that calculates the average sum over a predetermined number of reciprocation cycles, which cycles being a predetermined time after activation of the pump start-up switch, and stores the result in the memory device.

* * * * *